United States Patent Office 2,860,110
Patented Nov. 11, 1958

2,860,110

COATING COMPOSITION COMPRISING A METHYL METHACRYLATE POLYMER AND A CELLULOSE ESTER AND PROCESS FOR PREPARING SAME

Henry W. Godshalk, Swarthmore, Pa., assignor to E. I. du Pont de Nemours and Company, Wilmington, Del., a corporation of Delaware No Drawing. Application June 4, 1954
Serial No. 434,662

15 Claims. (Cl. 260—17)

This invention relates to pigmented coating compositions and particularly to pigmented coating compositions containing a polymer of methyl methacrylate which yield thin protective and decorative coatings having improved color or color uniformity throughout the surface area of the coating.

By the term "polymer of methyl methacrylate" and related terms, as used herein, are meant homopolymers of methyl methacrylate, copolymers of methyl methacrylate and other materials copolymerizable therewith containing a major proportion of methyl methacrylate, or mixtures of such homopolymers and/or copolymers.

The terms "methyl methacrylate lacquer," "methyl methacrylate coating composition," and related terms are used herein, for the sake of brevity, to signify liquid coating compositions containing conventional pigments and solvents and, as the principal film-forming material, a polymer of methyl methacrylate. The methyl methacrylate lacquers may also contain conventional modifiers such as plasticizers, inhibitors, dispersing agents, flow control agents and the like. When reference is made to coatings or films of methyl methacrylate lacquer the term signifies dry coatings obtained by applying such liquid coating compositions to a suitable substrate and permitting or causing the coating to dry.

By the term "flooding," as used herein, is meant non-uniformity of color of the dry coating resulting from the presence at the surface of myriad tiny spots and streaks of relatively light or dark pigment.

By the term "mottling," as used herein, is meant non-uniformity of appearance of the dry coating resulting from swirls, spots and streaks of aluminum pigment.

It is well known that the various pigments which are commonly used in paints, enamels or lacquers possess widely different properties with respect to their ability to be dispersed uniformly and relatively permanently in the vehicles or binders which comprise the film-forming media of such compositions. Rapid settling, absence of full color, weak tinting strength, and flooding or surface floating are among the important deficiencies known to be associated with poorly dispersed pigments.

It is further known that such deficiencies are not solely a function of the pigment, because a given pigment exhibits different dispersibility characteristics in different film-forming media. Accordingly, it is not surprising that some pigments are difficult to disperse in solutions of a polymer of methyl methacrylate. For instance, when a carbon black pigment is ground in a solution of a polymer of methyl methacrylate in a ball mill and the resulting dispersion is used as a coating composition, its color has a noticeable brown tone when compared to the full jet-black which the pigment is capable of producing in a different film-forming material, e. g., an alkyd resin solution. The same dispersion, when used to tint a white coating composition containing a polymer of methyl methacrylate to a light gray, produces flooding. Similarly, flooding occurs in various colored coating compositions made by tinting a white methyl methacrylate polymer coating composition with dispersions (in a polymer of methyl methacrylate) of such pigments as iron blues, phthalocyanine blues and greens, ferrite (iron oxide) yellow and other organic and inorganic pigments.

The principal object of this invention is to provide pigmented coating compositions which contain a polymer of methyl methacrylate as the preponderant film-forming material and which produce dry coatings characterized by uniform pigment dispersion and by the absence of deficiencies resulting from poor pigment dispersion, such as flooding and mottling.

Another object is to provide relatively pale-colored pigmented methyl methacrylate polymer coating compositions, thin dried films of which are substantially free of pigment mottling or flooding.

A further object is to provide a method of uniformly and relatively permanently dispersing finely-divided pigments in solutions of a polymer of methyl methacrylate for use in coating compositions containing a polymer of methyl methacrylate as the preponderant film-forming material.

These objects are accomplished by incorporating in a methyl methacrylate polymer coating composition a very small amount of a cellulose ester selected from the group consisting of cellulose nitrate, cellulose propionate, cellulose butyrate, cellulose acetate butyrate, cellulose acetate propionate, and mixtures thereof. The cellulose ester may be incorporated during the process of dispersing pigment in a polymer of methyl methacrylate or during the mixing of various intermediate components of the coating composition; or it may be added and mixed into an otherwise finished methyl methacrylate polymer coating composition.

Pigmented methyl methacrylate polymer coating compositions may be prepared by dispersing pigments, which are made for use in organic coating compositions, in a polymer of methyl methacrylate by means of conventional paint grinding equipment, such as ball or pebble mills, roller mills, Werner and Pfleiderer mixers, or Banbury mixers. Suitable solvents, diluents and plasticizers may be incorporated before, during, or after the milling operation to produce free-flowing finely ground coating compositions.

With the above and other objects in view, which will be apparent as the description proceeds, I have set forth my invention in the following specification, and have included several specific examples by way of illustration, but not by way of limitation. Unless otherwise specified the parts and percentages are given by weight.

*Example 1*

This example relates to dispersing chromium tetrahydrate (Guignet's Green) in a solution of a polymer of methyl methacrylate in the presence of nitrocellulose.

Part A:                                              Parts
  Chromium tetrahydrate pigment_____ 100
  Nitrocellulose solution_____  20
  Methyl ethyl ketone_____  40
  Butyl acetate_____  30
  Butyl alcohol_____  10
                                               ___
                                               200

Part B: Polymethyl methacrylate solution_____ 400
Part C: Polymethyl methacrylate solution_____ 812

The nitrocellulose solution of part A had the following composition:

| | Percent |
|---|---|
| Methyl isobutyl carbinyl acetate | 3.8 |
| Methyl isobutyl ketone | 16.0 |
| Methyl ethyl ketone | 14.1 |
| Hydrocarbons | 16.5 |
| Methyl isobutyl carbinol | 4.0 |
| Isopropyl alcohol | 16.0 |
| Nitrocellulose (lacquer grade; viscosity about 5 seconds in Formula C, ASTM D–301–33) | 29.6 |
| | 100.0 |

The polymethyl methacrylate solution of parts B and C had the following composition:

| | Percent |
|---|---|
| Polymethyl methacrylate (molecular weight approximately 100,000) | 35.7 |
| Dibutyl phthalate | 14.3 |
| Toluene | 27.7 |
| Xylene | 22.3 |
| | 100.0 |

The ingredients of part A were mixed in a mechanical stirrer until a uniform slurry was formed. Then, part B was added and the mixing was continued until a uniform slurry was again formed. The resulting mixture was milled for 15 minutes on a heated two-roll differential speed rubber mill with the rolls adjusted to produce a high shear in the mass passing between the rolls. The milled product was collected as a shredded dry sheet material which was dissolved in part C by vigorous mixing until a smooth liquid product was obtained.

About 2 cc. of the product was poured on a clean glass panel and was spread to form a uniform thin film by means of a doctor blade having a clearance of about 0.003 inch. The film was a clear transparent dark green, indicating that the pigment agglomerates had been completely broken up and that the pigment particles were in a state of very fine subdivision.

A similarly prepared film containing the same pigment which had been dispersed in the same manner in a polymethyl methacrylate solution without nitrocellulose was cloudy, indicating that the pigment agglomerates had not been broken up or that an equally fine state of subdivision of the individual pigment particles had not been obtained.

The coating composition containing nitrocellulose was an improvement over the one not containing nitrocellulose because it manifested the full color and tinting strength of the pigment, was more resistant to pigment settling and produced, in admixture with other pigmented polymethyl methacrylate compositions, lacquers having improved color and color uniformity.

In this example nitrocellulose was present in the amount of approximately 0.8% by weight based on the total weight of the non-volatile constituents.

*Example 2*

This example relates to dispersing carbon black (produced by incomplete combustion of natural gas) in a polymethyl methacrylate solution in the presence of nitrocellulose.

| Part A: | Parts |
|---|---|
| Carbon black pigment | 8 |
| Nitrocellulose solution | 26 |
| Benzyl butyl phthalate | 16 |
| Polymethyl methacrylate solution | 78 |
| | 128 |
| Part B: | |
| Benzyl butyl phthalate | 15 |
| Polymethyl methacrylate solution | 46 |
| Butyl acetate | 180 |
| | 241 |

The nitrocellulose solution of part A had the same composition as the nitrocellulose solution employed in Example 1.

The benzyl butyl phthalate plasticizer of parts A and B may be replaced by any of a wide variety of well-known plasticizers for polymethyl methacrylate, such as dibutyl phthalate, di(ethylene glycol monobutyl ether) phthalate, dibenzyl sebacate, tricresyl phosphate or toluene ethyl sulfonamide.

The polymethyl methacrylate solution of Parts A and B had the following composition:

| | Percent |
|---|---|
| Polymethyl methacrylate (molecular weight approximately 90,000) | 43.5 |
| Toluene | 39.5 |
| Acetone | 17.0 |
| | 100.0 |

The ingredients of part A were mixed in a mechanical stirrer and were then milled as in Example 1. The milled product was collected as a shredded dry sheet material which was mixed with the ingredients of part B until a smooth liquid product was obtained.

The product was thinned with 300 parts of toluene, and a sample was sprayed on a clean steel panel which was then baked in an oven for 15 minutes at 200° F.

The color of the resulting film was excellent with respect to jetness as a result of the uniform dispersion of the black pigment in a very finely divided state.

By comparison, a similarly prepared film containing the same pigment which had been dispersed in the same manner in a polymethyl methacrylate solution without nitrocellulose was brownish black and did not manifest the full jetness of the black pigment as a result of relatively poor dispersion.

In this example nitrocellulose was present in the amount of approximately 7.6% by weight based on the total weight of the non-volatile constituents.

*Example 3*

This example relates to eliminating undesirable pigment flotation or flooding in a polymethyl methacrylate coating composition by adding nitrocellulose thereto.

A coating composition having the following formula was prepared by conventional milling and mixing techniques:

| | Parts |
|---|---|
| Ferrite (iron oxide) yellow pigment | 14.6 |
| Phthalocyanine green pigment | 1.2 |
| Carbon black pigment | 0.3 |
| Titanium dioxide pigment | 80.0 |
| Polymethyl methacrylate (molecular weight approximately 85,000) | 268.5 |
| Toluene | 267.7 |
| Acetone | 133.7 |
| Xylene | 104.0 |
| Butyl alcohol | 4.9 |
| Benzyl butyl phthalate | 123.7 |
| Soya lecithin | 1.4 |
| | 1000.0 |

The benzyl butyl phthalate plasticizer may be replaced by any well-known plasticizer for polymethyl methacrylate, as described in Example 2.

A first portion of this coating composition was thinned to spraying viscosity by mixing therewith approximately 1.5 volumes of thinner per volume of coating composition. This thinned composition was applied to a metal panel by spraying. The panel was dried in an oven at 180° F. for 30 minutes. The dry coating was characterized by pigment flooding.

Nitrocellulose was added to and mixed intimately with a second portion of the coating composition in accordance with the following formula:

| | Parts |
|---|---|
| Above-described coating composition | 350 |
| Nitrocellulose solution | 17 |
| Additional solvent | 20 |
| | 387 |

The nitrocellulose solution was the same as described in Example 1.

The second portion was thinned and applied to a metal panel in the same manner as the first portion. The dry coating of the resulting composition containing nitrocellulose was characterized by excellent color uniformity, i. e., substantially complete absence of pigment flooding. This product containing nitrocellulose was suitable for painting an automobile body or other article which is subjected to critical examination with respect to its finished appearance, whereas the previously described product not containing nitrocellulose was not suitable.

In the second portion of this example nitrocellulose was present in the amount of approximately 2.8% by weight based on the total weight of the non-volatile constituents.

*Example 4*

This example relates to eliminating the mottling produced by an aluminum flake pigment in a polychromatic polymethyl methacrylate coating composition by adding nitrocellulose thereto.

A coating composition having the following formula was prepared by conventional milling and mixing techniques:

| | Parts |
|---|---|
| Phthalocyanine blue pigment | 14.5 |
| Blue lake pigment | 8.3 |
| Titanium dioxide pigment | 8.8 |
| Aluminum flake pigment | 5.9 |
| Carbon black pigment | 5.5 |
| Phthalocyanine green pigment | 0.6 |
| Polymethyl methacrylate (molecular weight approximately 80,000) | 289.9 |
| Toluene | 319.6 |
| Acetone | 120.7 |
| Xylene | 97.8 |
| Benzyl butyl phthalate | 128.4 |
| | 1000.0 |

The benzyl butyl phthalate plasticizer may be replaced by any well-known plasticizer for polymethyl methacrylate, as described in Example 2.

A first portion (300 parts) of this coating composition was thinned to spraying viscosity by mixing therewith 328 parts of a mixture having the following composition:

| | Percent |
|---|---|
| Toluene | 23.3 |
| Acetone | 43.1 |
| Amyl alcohol | 4.4 |
| Ethylene glycol monoethyl ether acetate | 9.0 |
| Hydrocarbon | 20.2 |
| | 100.0 |

The resulting thinned composition was applied to a metal panel by spraying. The panel was dried in an oven at 200° F. for 20 minutes. The dry coating was characterized by mottling.

A second portion (244 parts) of the coating composition was thinned to spraying viscosity by mixing therewith 272 parts of a 0.625% solution of nitrocellulose (lacquer grade; viscosity about 1000 seconds in Formula A, ASTM D-301-33) in the solvent mixture used to thin the first portion.

The resulting thinned composition containing nitrocellulose was applied to a metal panel in the same manner as the first portion. The dry coating was characterized by excellent uniformity of appearance, i. e., substantially complete absence of aluminum mottling. This improvement made the product containing nitrocellulose suitable for painting articles which require a uniform finished appearance, whereas the previously described product not containing nitrocellulose was not suitable.

In the second portion of this example nitrocellulose was present in the amount of approximately 1.6% by weight based on the total weight of the non-volatile constituents.

Substantially the same improved results were obtained by thinning a third portion (244 parts) of the coating composition with approximately 272 parts of a 1.25% solution of nitrocellulose (lacquer grade; viscosity about 160 seconds in Formula A, ASTM D-301-33) in the same solvent mixture used to thin the first portion. In this portion nitrocellulose was present in the amount of approximately 3.2% by weight based on the total weight of the non-volatile constituents.

*Example 5*

Two parts of a 20% solution of cellulose propionate in conventional lacquer solvents were added to 100 parts of a polymethyl methacrylate coating composition which contained white and black pigments and 56% of volatile solvents and which exhibited flooding of the black pigment. The resulting composition containing cellulose propionate exhibited substantially complete freedom from flooding.

In this example cellulose propionate was present in the amount of approximately 0.9% by weight based on the total weight of the non-volatile constituents.

Other cellulose esters, such as cellulose butyrate, cellulose acetate butyrate and cellulose acetate propionate, may be substituted for the cellulose propionate in this example.

It has been determined that as little as 0.1% by weight of a cellulose ester, based on the total weight of the non-volatile constituents, may be employed in this invention to improve the appearance or color uniformity of pigmented methyl methacrylate polymer coating compositions. It has further been determined that 10% of cellulose ester, on the same basis, represents a concentration above which no further appreciable improvement is realized. The preferred amount of cellulose ester is between about 0.5% and about 8% by weight based on the total weight of the non-volatile constituents. The preferred cellulose esters are the nitric acid esters, commonly referred to as nitrocellulose or cellulose nitrate.

It will be obvious to those skilled in the organic coating art that only a small concentration of cellulose ester will usually be required in compositions containing a small amount of troublesome pigment, whereas a larger concentration will usually be required for larger amounts of the more troublesome pigments. Also, in this respect, a relatively small amount of a higher viscosity cellulose ester will usually produce substantially the same improvement as a large amount of a lower viscosity cellulose ester.

It is to be understood that, although a polymer of methyl methacrylate is the principal and essential film-forming constituent of these compositions, minor proportions of other well-known film-forming constituents may be incorporated to impart further desirable properties, such as varying degrees of hardness or flexibility to the products. Obviously such film-forming materials must be compatible with the other constituents of the composition. Examples of such film-forming materials are, for instance, polymers and copolymers of vinyl esters, polymers and copolymers of acrylic esters other than the essential polymer of methyl methacrylate, oil-modified alkyd resins and natural resins.

It is further to be understood that the particular methyl methacrylate polymers, pigments, solvents, diluents and plasticizers employed in the examples are merely illustrative of a wide variety of such materials which may be used and which are well known to those skilled in the organic coating art.

A polymer of methyl methacrylate may be prepared by polymerizing methyl methacrylate monomer, with or without another monomer copolymerizable therewith, in bulk, in solution or in granular form to produce polymers having a wide range of molecular weight. Polymers having a molecular weight of about 55,000 to 105,000 are readily soluble in a wide variety of common and relatively inexpensive solvents and are preferred in the practice of this invention.

The molecular weight values, as employed in the description of this invention are on the basis of weight average molecular weight. The values referred to as molecular weight are calculated from the equation $$M = 1.47 \times 10^6 (N_r - 1 - 1nN_r)^{0.65}$$

in which M is the molecular weight and $N_r$ is the relative viscosity of the polymer in question, specifically the value of the fraction (A) Efflux time of polymer solution
----
(B) Efflux time of solvent used in polymer solution The efflux times are measured in accordance with the procedure of ASTM–D–445–46T, Method B, using, as the "oil" mentioned in said procedure, (A) a solution of 0.25 gram of the polymer of methyl methacrylate being tested in 50 cc. of ethylene dichloride, and (B) a sample of the ethylene dichloride used in making said solution, respectively. The determinations are run at 25° C. in a modified Ostwald viscosimeter, series 50.

By this method the preferred polymers of methyl methacrylate employed in this invention have $N_r$ values (i. e., relative viscosities) between 1.117 and 1.196, which correspond to calculated molecular weight values of 55,000 and 105,000, respectively.

It is to be understood that the methyl methacrylate lacquer employed in the foregoing description of this invention is merely representative of a wide variety of such lacquers which may be used in the practice of this invention. All of the constituents of said lacquer may be varied in kind and/or proportion by means well known in the art. A suitable homopolymer of methyl methacrylate is specifically disclosed. Suitable copolymers include copolymers of methyl methacrylate with a minor proportion, e. g., 2%–25%, of another material copolymerizable therewith, for instance, acrylic and methacrylic acids, the $C_1$–$C_4$ alkyl esters thereof, vinyl acetate, acrylonitrile, and styrene. A particularly useful copolymer contains about 98% of methyl methacrylate and 2% methacrylic acid.

Examples of useful pigments are, for instance, iron blues, organic reds and maroons, silica, talc, china clay and metallic oxides, silicates, chromates, sulfides and sulfates.

Examples of useful volatile solvents and diluents are, for instance, aliphatic, cycloaliphatic and aromatic hydrocarbons, esters, ethers, ketones and alcohols.

Many well-known plasticizers for polymers of methyl methacrylate may be employed in the compositions of this invention.

However, the particular plasticizer used affects the physical properties of the resulting coating, including cracking, crazing, flexibility, durability, etc. The preferred plasticizer is benzyl butyl phthalate, because it imparts the best overall balance of properties and especially the crack-resistance. Other plasticizers which will produce films having especially desirable properties are dibutyl phthalate, triphenyl phosphate, 2-ethyl hexyl benzyl phthalate and dicyclohexyl phthalate. Other well-known plasticizers for polymers of methyl methacrylate which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tribuyl citrate, dibenzyl sebacate, tricresyl phosphate, toluene ethyl sulfonamide, the di 2-ethyl hexyl ester of hexamethylene diphthalate, di(methylcyclohexyl) phthalate. Plasticizers are normally employed in amounts of about 10–50% by weight based on the weight of the polymer of methyl methacrylate.

Other well-known modifying agents for organic coating compositions may be incorporated to alter the manufacturing, storage, application or service properties of the compositions of this invention, such as soya lecithin, silicone fluids, triethanolamine, fatty oil acids and glyceride oil derivatives.

The products of this invention may be applied to a wide variety of substrates such as wood, glass and metal by any well-known application method, such as spraying, dipping or brushing. Although the coatings may be air-dried, the drying period can be minimized by baking. The resulting coatings may be rubbed or polished, if desired, to impart further smoothness and/or higher apparent gloss.

The products are most useful for coating articles which are subjected to the weather and which are required to protect the substrate and to retain a pleasing and decorative appearance for long periods. For these reasons the products are particularly useful as top coat finishes for application to suitably primed automobile bodies.

As many widely different embodiments of this invention may be made without departing from the spirit and scope thereof, it is to be understood that the invention is not limited except as defined in the appended claims.

I claim:

1. A pigmented coating composition, which produces a dry coating characterized by uniform pigment dispersion and by the absence of pigment flooding and mottling, comprising a polymer of methyl methacrylate as the preponderant film-forming material, volatile solvent therefor, plasticizer therefor, pigment and about 0.1–10%, by weight, based on the total weight of non-volatile constituents in said coating composition, of a cellulose ester selected from the group consisting of cellulose nitrate, cellulose propionate, cellulose butyrate, cellulose acetate butyrate, cellulose acetate propionate, and mixtures thereof, said polymer of methyl methacrylate being at least one material of the group consisting of homopolymers of methyl methacrylate and copolymers of methyl methacrylate with from 2 to 25% by weight of a member of the group consisting of acrylic acid, methacrylic acid, a 1 to 4 carbon alkyl ester of acrylic acid, a 2 to 4 carbon alkyl ester of methacrylic acid, vinyl acetate, acrylonitrile and styrene; and said polymer of methyl methacrylate being further characterized by having a relative viscosity of about 1.117 to 1.196, said relative viscosity being the quotient obtained by dividing the efflux time of a solution of 0.25 gram of said methyl methacrylate component in 50 cc. of ethylene dichloride by the efflux time of ethylene dichloride, said efflux times being measured in accordance with the procedure of ASTM D–445–46T, Method B, at 25° C. using a modified Ostwald viscosimeter, series 50.

2. The coating composition of claim 1, in which the cellulose ester is present in an amount of about 0.5–8%, by weight, based on the total weight of non-volatile constituents in said coating composition.

3. The coating composition of claim 1, in which the cellulose ester is cellulose nitrate.

4. The coating composition of claim 1, in which the cellulose ester is cellulose propionate.

5. The coating composition of claim 1, in which the cellulose ester is cellulose butyrate.

6. The coating composition of claim 1, in which the cellulose ester is cellulose acetate butyrate.

7. The coating composition of claim 1, in which the cellulose ester is cellulose acetate propionate.

8. The coating composition of claim 1, in which the polymer of methyl methacrylate is a homopolymer.

9. The coating composition of claim 1, in which the polymer of methyl methacrylate is a copolymer of methyl methacrylate and about 2-25% by weight, based on said copolymer, of a member of the group which consists of acrylic acid, methacrylic acid, a 1 to 4 carbon alkyl ester of acrylic acid, a 2 to 4 carbon alkyl ester of methacrylic acid, vinyl acetate, acrylonitrile and styrene.

10. The coating composition of claim 1, in which the polymer of methyl methacrylate is a mixture of a homopolymer of methyl methacrylate and a copolymer of methyl methacrylate and about 2-25% by weight, based on said copolymer, of a member of the group which consists of acrylic acid, methacrylic acid, a 1 to 4 carbon alkyl ester of acrylic acid, a 2 to 4 carbon alkyl ester of methacrylic acid, vinyl acetate, acrylonitrile and styrene.

11. The process of making a pigmented coating composition which will produce a dry coating characterized by uniform pigment dispersion and by the absence of pigment flooding and mottling, which comprises mixing a polymer of methyl methacrylate as the preponderant film-forming material with volatile solvent therefor, plasticizer therefor, pigment and about 0.1-10%, by weight, based on the total weight of non-volatile constituents in said coating composition, of a cellulose ester selected from the group consisting of cellulose nitrate, cellulose propionate, cellulose butyrate, cellulose acetate butyrate, cellulose acetate propionate, and mixtures thereof, said polymer of methyl methacrylate being at least one material of the group consisting of homopolymers of methyl methacrylate and copolymers of methyl methacrylate with from 2 to 25% by weight of a member of the group consisting of acrylic acid, methacrylic acid, a 1 to 4 carbon alkyl ester of acrylic acid, a 2 to 4 carbon alkyl ester of methacrylic acid, vinyl acetate, acrylonitrile and styrene; and said polymer of methyl methacrylate being further characterized by having a relative viscosity of about 1.117 to 1.196, said relative viscosity being the quotient obtained by dividing the efflux time of a solution of 0.25 gram of said methyl methacrylate component in 50 cc. of ethylene dichloride by the efflux time of ethylene dichloride, said efflux times being measured in accordance with the procedure of ASTM D-445-46T, Method B, at 25° C. using a modifier Ostwald viscosimeter, series 50.

12. The process of claim 11, in which the cellulose ester constituents about 0.5-8%, by weight, based on the total weight of non-volatile constituents in said coating composition.

13. The process of claim 11, in which the cellulose ester is added during the dispersion of the pigment in the polymer of methyl methacrylate.

14. The process of claim 11, in which the cellulose ester is added during the mixing of all of the other components.

15. The process of claim 11, in which the cellulose ester is added after the mixing of all of the other components.

References Cited in the file of this patent

UNITED STATES PATENTS

| | | |
|---|---|---|
| Re. 23,753 | Bjorksten | Dec. 15, 1953 |
| 2,069,983 | Ubben | Feb. 9, 1937 |
| 2,139,008 | Ensminger | Dec. 6, 1938 |
| 2,292,393 | Mitchell | Aug. 11, 1942 |